(12) United States Patent
Terakubo et al.

(10) Patent No.: US 12,320,145 B2
(45) Date of Patent: Jun. 3, 2025

(54) PLANT CONSTRUCTION METHOD

(71) Applicant: JGC CORPORATION, Kanagawa (JP)

(72) Inventors: Noriaki Terakubo, Kanagawa (JP);
Hiroteru Igarashi, Kanagawa (JP);
Atsuo Honiden, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 922 days.

(21) Appl. No.: 17/430,730

(22) PCT Filed: Jun. 25, 2019

(86) PCT No.: PCT/JP2019/025131
§ 371 (c)(1),
(2) Date: Aug. 13, 2021

(87) PCT Pub. No.: WO2020/261376
PCT Pub. Date: Dec. 30, 2020

(65) Prior Publication Data
US 2022/0106802 A1  Apr. 7, 2022

(51) Int. Cl.
*E04H 5/02* (2006.01)
*B33Y 30/00* (2015.01)
*B33Y 80/00* (2015.01)

(52) U.S. Cl.
CPC ............... *E04H 5/02* (2013.01); *B33Y 30/00* (2014.12); *B33Y 80/00* (2014.12)

(58) Field of Classification Search
CPC ............ E04H 5/02; B33Y 30/00; B33Y 80/00
See application file for complete search history.

(56) References Cited

U.S. PATENT DOCUMENTS

| 7,641,461 B2 * | 1/2010 | Khoshnevis | ........ E04G 21/0463 |
| | | | 425/375 |
| 10,066,413 B2 * | 9/2018 | Khoshnevis | .......... E04H 12/341 |
| (Continued) | | | |

FOREIGN PATENT DOCUMENTS

| CA | 3050945 A1 * | 1/2020 | ............. B33Y 10/00 |
| CN | 105715052 A  * | 6/2016 | |
| (Continued) | | | |

OTHER PUBLICATIONS

"International Search Report (Form PCT/ISA/210) of PCT/JP2019/025131," mailed on Jul. 30, 2019, with English translation thereof, pp. 1-4.

*Primary Examiner* — Babajide A Demuren
(74) *Attorney, Agent, or Firm* — JCIPRNET (57) ABSTRACT

A plant construction method is provided and includes: installing a group of devices (2) for processing fluid; and forming, by a 3D printer (1), a framework structure (3) configured to support a piping (5), which allows the fluid to be transferred among devices (2) included in the group of devices (2), in a region different from an installation region for the group of devices (2). When the framework structure (3) is thus formed by the 3D printer (1), the group of devices (2) for processing the fluid can be installed without being restricted by the step of forming the framework structure (3). There is no need to secure a plot for assembly of the framework structure (3), and hence a construction site can be reduced in size. It is not required for workers to come to the construction site and assemble the framework structure (3), and hence safety is enhanced.

5 Claims, 6 Drawing Sheets

(56) References Cited

U.S. PATENT DOCUMENTS

| | | | |
|---|---|---|---|
| 10,486,330 B2 * | 11/2019 | Giles | B28B 3/20 |
| 11,167,444 B2 * | 11/2021 | Le Roux | B28B 1/001 |
| 11,590,711 B2 * | 2/2023 | Nikshi | B33Y 50/02 |

FOREIGN PATENT DOCUMENTS

| | | | |
|---|---|---|---|
| CN | 106639324 A | * | 5/2017 |
| CN | 109208918 A | * | 1/2019 |
| JP | 2015143560 | | 8/2015 |
| JP | 6378699 | | 8/2018 |
| JP | 2018144070 | | 9/2018 |
| JP | 2018154093 | | 10/2018 |
| JP | 6513554 | | 5/2019 |
| WO | 2014028961 | | 2/2014 |
| WO | 2018198572 | | 11/2018 |

* cited by examiner

PLANT CONSTRUCTION METHOD

CROSS-REFERENCE TO RELATED APPLICATION

This application is a 371 application of the international PCT application serial no. PCT/JP2019/025131, filed on Jun. 25, 2019. The entirety of the above-mentioned patent application is hereby incorporated by reference herein and made a part of this specification.

TECHNICAL FIELD

The present invention relates to a technology for constructing a plant.

BACKGROUND ART

Examples of a plant for processing fluid include a natural gas plant for liquefying natural gas and separating/recovering a natural gas liquid, a petroleum refining plant for distilling and desulfurizing crude oil or various intermediate products, and a chemical plant for producing a petrochemical product, an intermediate chemical product, and a polymer.

As described in Patent Literature 1, those plants have a structure in which a group of a large number of devices including static devices, such as columns, tanks, and heat exchangers, dynamic devices, such as pumps, and piping provided among those static devices and dynamic devices, are arranged. Further, among the group of devices, there is provided a pipe rack configured to support a piping for allowing the fluid to be transferred among the devices.

Such plants are constructed in such a manner that construction materials are carried into a construction site through use of, for example, a crane, and devices and constituent members of a framework and a pipe rack for supporting the devices are assembled sequentially. Thus, a plot plan and a construction schedule for the devices and the pipe rack in the plant are significantly restricted by, for example, a carry-in path of the construction materials and an arrangement position of the crane. Under such restrictions, there have been demands for reducing the number of plant construction workers and improving safety in a working environment.

CITATION LIST

Patent Literature

[Patent Literature 1] WO 2014/028961 A1

SUMMARY OF INVENTION

Technical Problem

The present invention has been made in view of such backgrounds, and provides a technology for constructing a plant safely while reducing restrictions on construction of the plant.

Solution to Problem

According to the present invention, there is provided a construction method for a plant configured to process fluid, the construction method including the steps of: installing a group of devices for processing the fluid; and forming, by a 3D printer, a framework structure configured to support a piping, which allows the fluid to be transferred among devices included in the group of devices, in a region different from an installation region for the group of devices.

The construction method for a plant may have the following features.

(a) The construction method for a plant further includes, in addition to the step of forming the framework structure, a step of conveying a pipe material for forming the piping from an outside to the framework structure under formation, and forming the piping to be supported on the framework structure.

(b) The framework structure is configured to support the piping by each floor of a multi-floor structure including a plurality of floors stacked in an up-and-down direction, and forming of one floor included in the multi-floor structure in the step of forming the framework structure, and forming of the piping to be supported by the one floor in the step of forming the piping are performed repeatedly.

(c) The 3D printer is configured to integrally form the piping and the framework structure.

(d) The framework structure is configured to support the piping by each floor of a multi-floor structure including a plurality of floors stacked in an up-and-down direction, and integral forming of one floor included in the multi-floor structure and the piping to be supported by the one floor in the step of forming the framework structure is performed repeatedly.

(e) The step of forming the framework structure is performed after the step of installing the group of devices.

Advantageous Effects of Invention

The construction method for a plant includes the steps of: installing the group of devices for processing the fluid; and forming, by the 3D printer, the framework structure configured to support the piping, which allows the fluid to be transferred among devices included in the group of devices, in the region different from the installation region for the group of devices. When the framework structure is thus formed by the 3D printer, the group of devices for processing the fluid can be installed without being restricted by the step of forming the framework structure. Moreover, there is no need to secure a plot for assembly of the framework structure, and hence a construction site can be reduced in size. Further, it is not required for workers to come to the construction site and assemble the framework structure, and hence safety is enhanced.

Moreover, when it is intended to install the devices 2 to be arranged around the pipe rack 3 before forming of the pipe rack 3 to be arranged at a center portion of the plant, it is required to use a large-sized crane capable of conveying the constituent 2 members constituent members of the pipe rack 3 over the other devices 2 that already have been arranged. As a result, it is required that an entry region for the large-sized crane be secured in the installation region for the group of devices 2 to be arranged around the pipe rack 3. Thus, there also arises a problem in that an installation area of the plant is increased. pipe rack.

DESCRIPTION OF EMBODIMENTS

Figure 1:
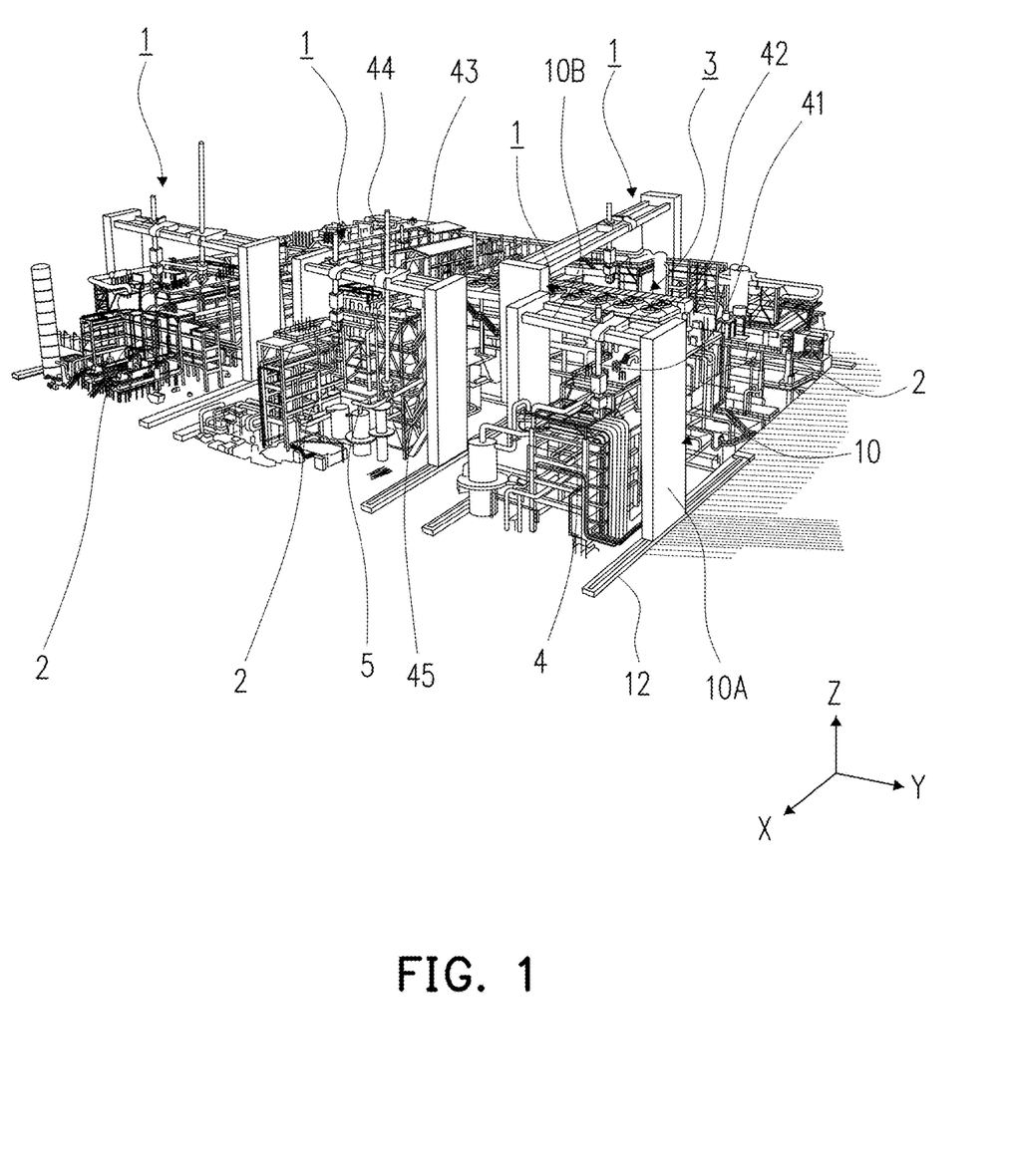
FIG. 1 is a perspective view for illustrating an overall configuration of a plant.

FIG. 1 is a perspective view for illustrating the entirety of a plant constructed by a 3D printer (additive manufacturing device). As illustrated in FIG. 1, the applicant conducts technical development with a view to eventually forming most of components of the plant, such as devices, piping, and a framework, by the 3D printer. In the subject application, as an elemental technology, description is made of forming a pipe rack through use of the 3D printer.

Here, currently, patents have been granted for technologies for manufacturing, by the 3D printer, large-sized members such as aircraft fuselage parts and wings (for example, Japanese Patent No. 6513554), and building materials (for example, Japanese Patent No. 6378699). Further, based on, for example, investigations of development circumstances of 3D printer manufacturers, the inventors of the subject application have grasped that the 3D printer capable of forming a large structure can be provided when there are demands from consumers.

The plant illustrated in FIG. 1 is, for example, a plant configured to manufacture liquefied natural gas (LNG) being fluid, and includes a large number of devices 2 configured to perform liquefaction pre-processing and liquefaction of the pre-processed natural gas. Further, by the side of an installation region for each device 2, there is provided a pipe rack 3 being a framework structure configured to support pipings for allowing various kinds of fluid, which are to be used in the LNG plant, to be transferred among the devices 2. Although detailed description is made later, the pipe rack 3 is formed of, for example, a framework having a multi-floor structure including a plurality of floors stacked in an up-and-down direction. On each floor, a plurality of pipings are supported.

In a construction method for a plant according to an embodiment of the present invention, the above-mentioned pipe rack 3 is formed by a 3D printer 1. As illustrated in FIG. 1, the 3D printer 1 includes a gate-shaped support unit 10 including a beam portion 10B, and two support pillars 10A supporting both ends of the beam portion 10B. For example, the support unit 10 is provided so as to straddle a group of the large number of devices 2 forming the LNG plant, and an installation region for the pipe rack 3 from above. Further, at a lower end of the support unit 10, there is provided a support unit moving mechanism (not shown) configured to move the support unit 10. The support unit moving mechanism is freely movable along guide rails 12 that are provided on the ground so as to extend in a direction orthogonal to an extending direction of the beam portion 10B.

Moreover, on the beam portion 10B, a moving member 42 is provided so as to be freely movable along the beam portion 10B. Further, the moving member 42 includes a shaft portion 41 extending downward. At a lower end of the shaft portion 41, there is provided a printer main body 4 configured to perform 3D printing by ejecting downward a material for forming the pipe rack 3. The support unit 10 is moved along the guide rails 12 (moved in, for example, an X-axis direction in FIG. 1), the moving member 42 is moved along the beam portion 10B in a direction orthogonal to an extending direction of the guide rails 12 (moved in, for example, a Y-axis direction in FIG. 1), and the printer main body 4 is moved up and down along the shaft portion (moved up and down in a Z-axis direction). Thus, the printer main body 4 is freely movable in the X-axis direction, the Y-axis direction, and the Z-axis direction.

Further, the 3D printer 1 configured to form the pipe rack 3 may include an arm moving member 43 that is moved along the beam portion 10B. The arm moving member 43 includes a shaft portion 44 extending downward. At a lower end of the shaft portion 44, an arm 45 is provided. The arm 45 is configured to receive, from an outside, a pipe material for forming a piping to be arranged on the pipe rack 3 (hereinafter, the pipe material and the piping formed by providing the pipe material on the pipe rack 3 are collectively referred to as "piping 5"), and then convey the piping to an arrangement position. Similarly to the printer main body 4, the arm 45 is also freely movable in the X-axis direction, the Y-axis direction, and the Z-axis direction.

As the printer main body 4, there can be given, for example, a 3D printer employing directed energy deposition in which a constituent material such as metal powder or a resin ejected from a nozzle is laminated and accumulated from a lower layer side to form an object. As a matter of course, a 3D printer employing a method different from the directed energy deposition may also be used.

Next, forming of the pipe rack 3 is described. FIG. 2 to FIG. 6 are illustrations of steps of constructing the pipe rack 3 through use of the 3D printer 1 described above. When plant is manufactured, first, a foundation 100 is formed in accordance with arrangement of structures such as the devices 2 and the pipe rack 3, and a group of devices 2, which relates to processing of various kinds of fluid to be used in the LNG plant, is installed on the foundation 100. Then, in a region different from an installation region for the group of devices 2, the pipe rack 3 is formed by the 3D printer 1. The pipe rack 3 is configured to support the piping 5 for allowing the fluid to be transferred among devices included in the group of devices 2 (see FIG. 2 and FIG. 9 to be described later).

The pipe rack 3 is formed of a framework having the multi-floor structure including the plurality of floors stacked in the up-and-down direction, and the plurality of pipings 5 are supported on each floor 31. The pipe rack 3 in the embodiment is made of a structural material such as a metal material, a ceramic material, or a resin material. The printer main body 4 ejects, for example, those materials, and forms the pipe rack 3 having a strength sufficient for supporting the pipings 5. The framework forming the pipe rack 3 may have a framed structure such as a truss structure or a rigid-frame structure, or may have a honeycomb structure or a lattice structure.

Figure 2:
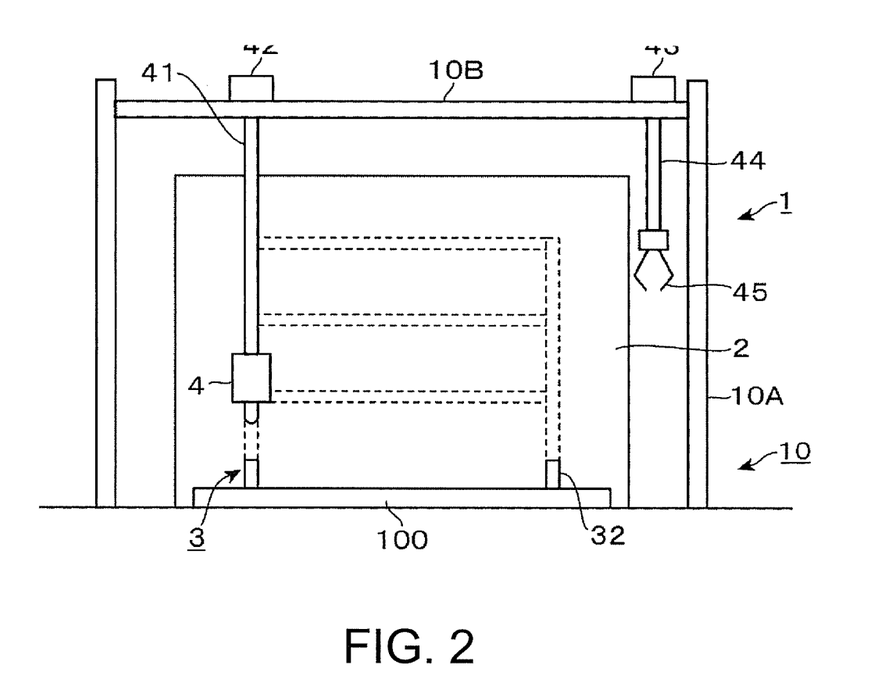
FIG. 2 is a first operation view for illustrating steps of forming a pipe rack.

First, the 3D printer 1 is moved into the installation region for the pipe rack 3, and as illustrated in FIG. 2, constituent members for the pipe rack 3 are successively stacked on the foundation 100 from lower portions of pillars 32, thereby forming the pipe rack 3.

Figure 3:
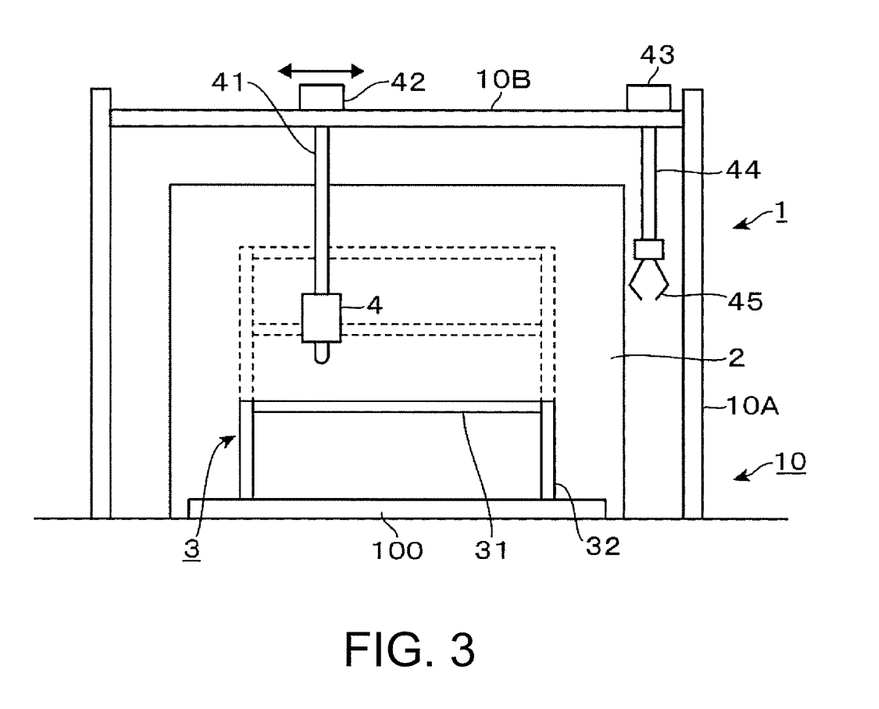
FIG. 3 is a second operation view for illustrating the steps of forming the pipe rack.
Figure 4:
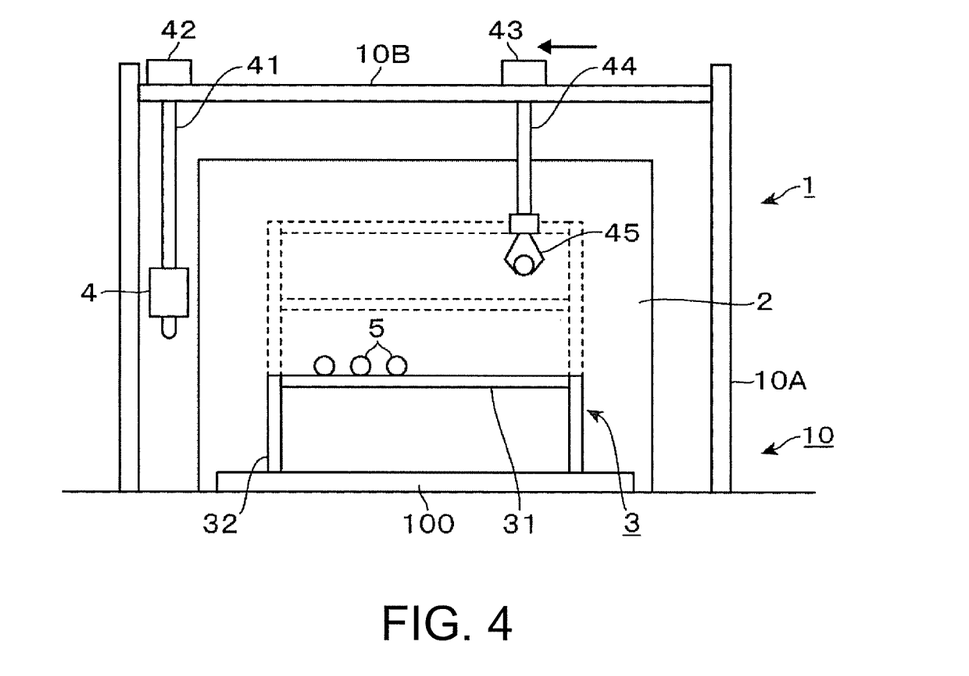
FIG. 4 is a third operation view for illustrating the steps of forming the pipe rack.
Figure 5:
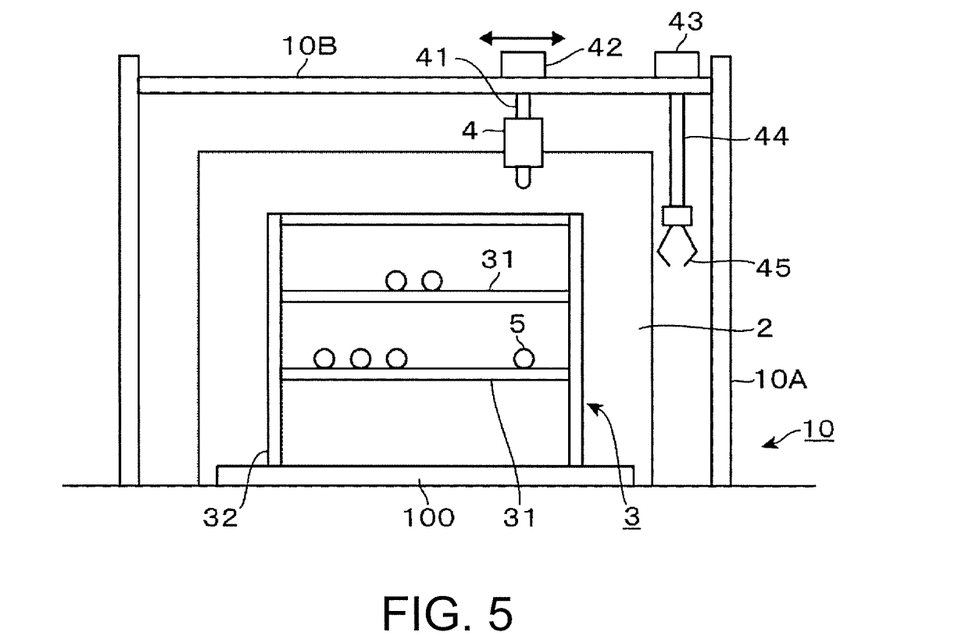
FIG. 5 is a fourth operation view for illustrating the steps of forming the pipe rack.
Figure 6:
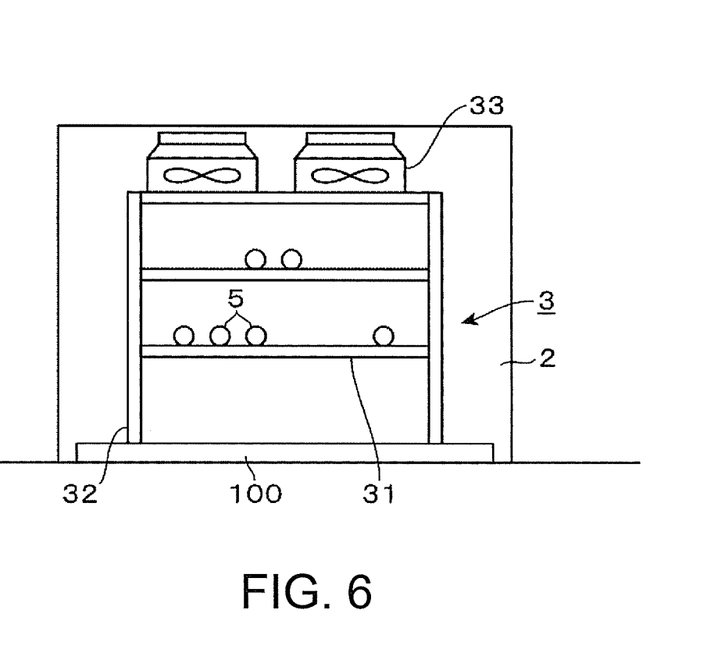
FIG. 6 is a fifth operation view for illustrating the steps of forming the pipe rack.

Then, as illustrated in FIG. 3, after the pillars 32 are formed to an installation height of the first floor 31, the floor 31 to be supported by the pillars 32 is formed. After that, as illustrated in FIG. 4, forming of the pipe rack 3 is temporarily suspended, and the printer main body 4 is retreated from the installation region for the pipe rack 3. Moreover, the pipings 5 are conveyed by the arm 45 from the outside onto the pipe rack 3 under formation, and the pipings 5 to be supported on the floor 31 are formed. Through repetition of forming one floor 31 included in the multi-floor structure, and forming the pipings 5 to be supported on the one floor 31, as illustrated in FIG. 5, there can be formed the pipe rack 3 having the multi-floor structure in which the pipings 5 are supported on each floor 31. Moreover, when necessary, for example, the 3D printer 1 is retreated from the installation region for the pipe rack 3, and an air-cooled heat exchanger (ACHE) 33 is installed on top of the pipe rack 3 (FIG. 6), thereby completing the pipe rack 3.

Figure 7:
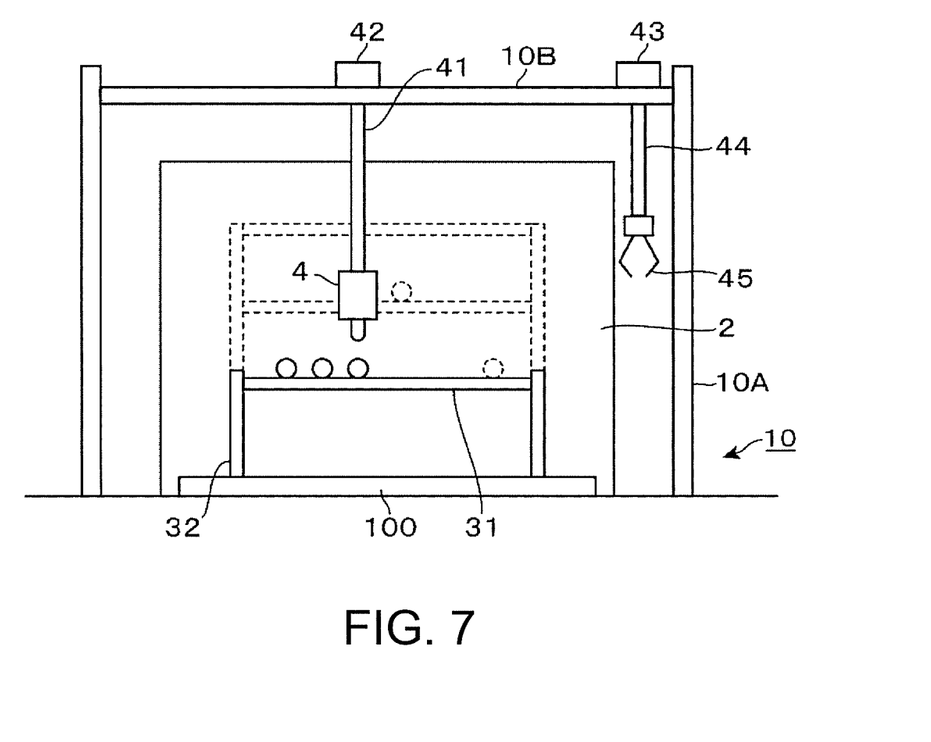
FIG. 7 is an operation view for illustrating another example of the steps of forming the pipe rack.

Further, when the pipe rack 3 is formed, the 3D printer 1 may integrally form both of the pipings 5 to be supported on the framework, and the framework (main body of the pipe rack 3) having the multi-floor structure. For example, when the pipe rack 3 is formed on the foundation 100 as illustrated in FIG. 7, after the floor 31 intended to support the pipings 5 is formed, without retreating the printer main body 4 from the installation region for the pipe rack 3, the pipings 5 to be arranged on the floor 31 are integrally formed at the same time with forming of the pillars 32 above the floor 31. In this manner, the pipe rack 3 may be formed through repetition of integral forming of one floor 31 included in the multi-floor structure, and the pipings 5 to be supported on the one floor 31.

Such pipings 5 may be made of the same material as that for the pipe rack 3. Alternatively, although FIG. 7 shows the printer main body 4 configured to form the framework of the pipe rack 3 through use of one nozzle, the pipe rack 3 and the pipings 5 may be formed through selective use of a plurality of nozzles that feed different materials, respectively.

As a material for forming the piping 5, there is selected, for example, a metal material, a ceramic material, or a resin material having strength and corrosion resistance in accordance with, for example, a temperature, a pressure, and a chemical property of the fluid flowing in the piping 5. Further, an inner surface of the piping 5 may be lined with a lining material, or an outer surface of the piping 5 may be covered with a heat insulating material.

Further, after all of the floors 31 of the pipe rack 3 are formed, the pipings 5 may be carried into and arranged in each of the floors 31 by the arm 45. The pipings 5 to be arranged by the arm 45 may also be manufactured in, for example, some other place through use of the 3D printer 1.

Through the above-mentioned manufacturing steps using the 3D printer 1, the pipe rack 3 and the pipings 5 formed integrally with the pipe rack 3 can be formed.

Figure 8:
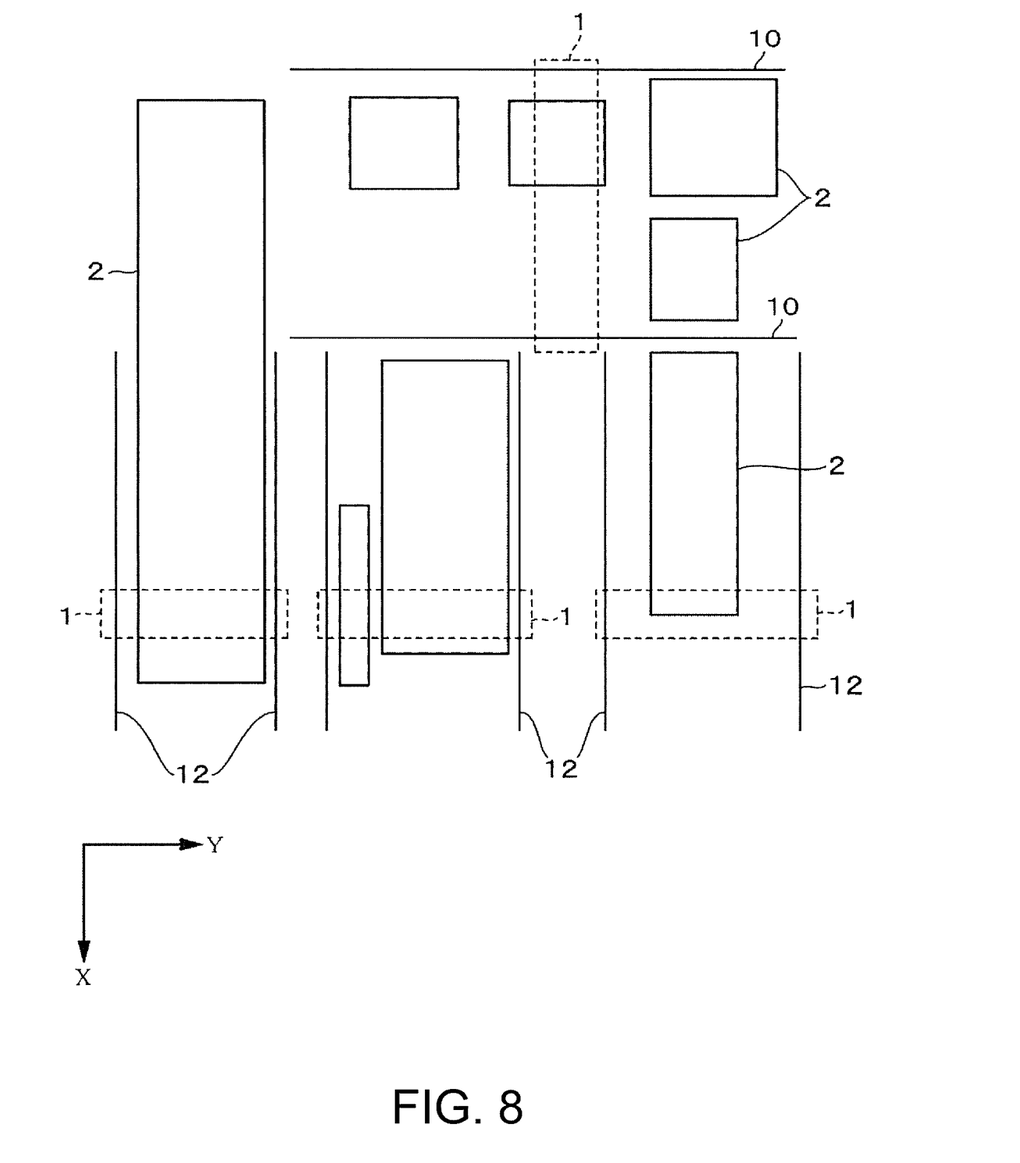
FIG. 8 is a first operation view for illustrating steps of constructing the plant.
Figure 9:
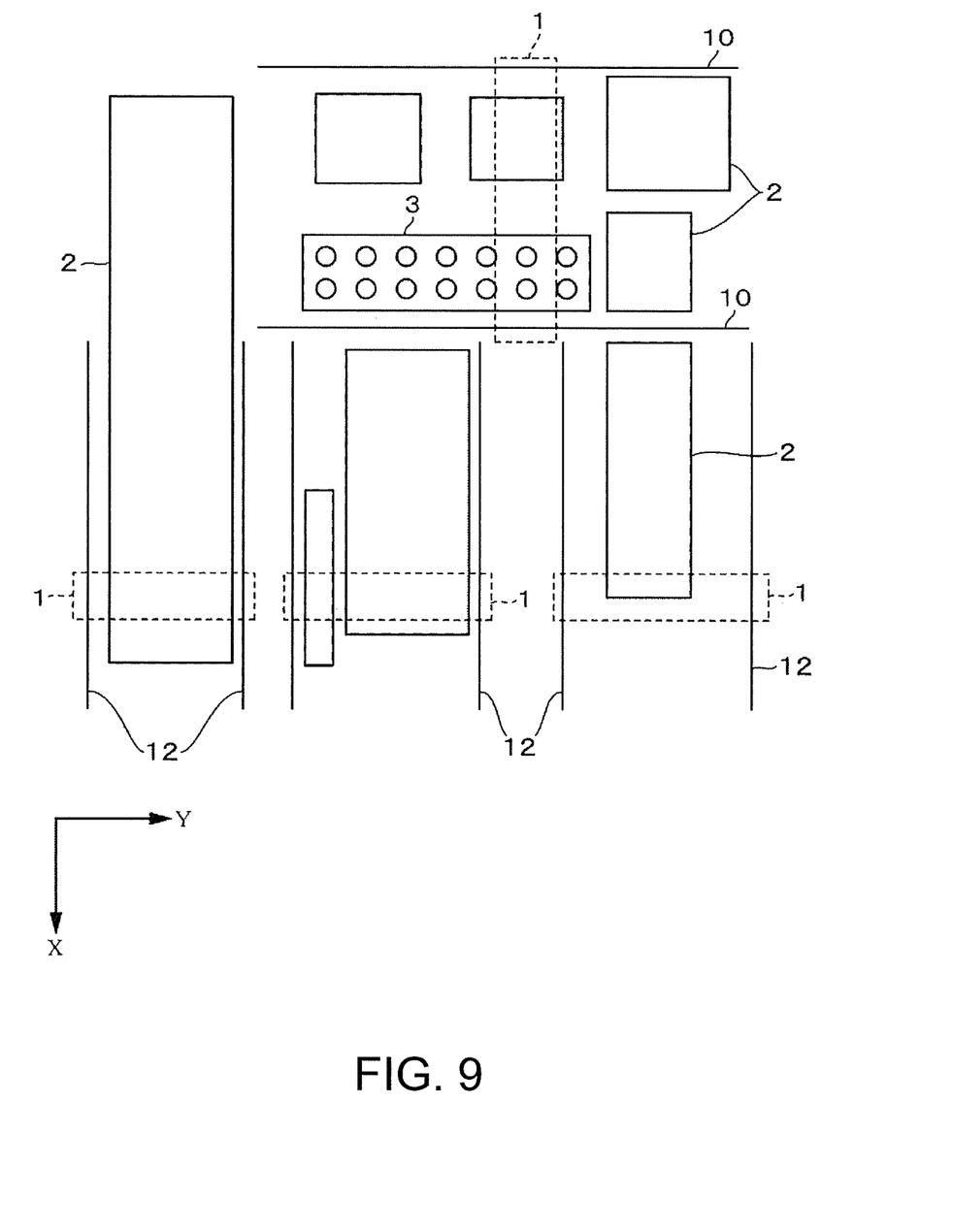
FIG. 9 is a first operation a second operation view for illustrating the steps of constructing the plant.

Further, as illustrated in plan views of FIG. 8 and FIG. 9, when the pipe rack 3 is formed through use of the 3D printer 1, the group of devices 2 forming the LNG plant can be arranged in an early stage, and then the pipe rack 3 can be formed in a final stage.

As illustrated in FIG. 8, in the ordinary LNG plant, a layout of arranging a group of the other devices 2 around the installation region for the pipe rack 3 is adopted in many cases.

Meanwhile, it is required to determine a size and arrangement of the piping 5 in the pipe rack 3 in accordance with design of each device 2. Accordingly, when design modification is made to the other devices 2 in configuration, size, or arrangement position, design of the pipe rack 3 is also modified in many cases. Therefore, the pipe rack 3 is designed after the devices 2 are designed.

At the time of forming the conventional LNG plant, through use of, for example, a crane, constituent members such as H steel are combined one after another, thereby building the pipe rack 3. Accordingly, as in the layout illustrated in FIG. 8, when the group of devices 2 is installed in a region outside the pipe rack 3 before the pipe rack 3 is arranged near a center of the LNG plant, there are difficulties in conveying materials and arranging the crane. Meanwhile, as described above, design of the pipe rack 3 is most susceptible to design modification of the other devices 2. When the pipe rack 3 is built early, it is difficult to modify design of the devices 2 to be arranged around the pipe rack 3. As a result, a degree of freedom in design modification of the LNG plant is reduced in some cases.

Moreover, when it is intended to install the devices 2 to be arranged around the pipe rack 3 before forming of the pipe rack 3 to be arranged at a center portion of the plant, it is required to use a large-sized crane capable of conveying the constituent 2 members of the pipe rack 3 over the other devices 2 that already have been arranged. As a result, it is required that an entry region for the large-sized crane be secured in the installation region for the group of devices 2 to be arranged around the pipe rack 3. Thus, there also arises a problem in that an installation area of the plant is increased.

As countermeasures against the problems, in the method according to the present invention using the 3D printer 1, first, arrangement of the group of devices 2 forming the LNG plant is completed (FIG. 8), and then the 3D printer 1 is moved into the installation region for the devices 2, thereby being capable of forming the pipe rack 3 (FIG. 9).

Even when the pipe rack 3 is thus formed after arrangement of the group of devices 2, there is no need to secure the entry region that is required in a case of using the large-sized crane.

According to the present invention, the printer main body 4 of the 3D printer 1 is moved to a position above a region in which the pipe rack 3 is to be formed, and a material for the framework is ejected from above the region, thereby being capable of forming the pipe rack 3. Accordingly, even after the group of devices 2 closer to an outer side of the plant is constructed, the pipe rack 3 can be formed without needs to secure the entry region for the crane and a region into which the framework forming the pipe rack 3 is to be carried. Therefore, a construction schedule can be arranged without being restricted by forming of the pipe rack 3, and increase in size of the plant can be prevented. Further, it is not required for workers to work on a construction site during a period from forming of the pipe rack 3 to installation of the pipings 5, and hence accidents to workers can be prevented.

In particular, the pipe rack 3 has the configuration in which the plurality of floors 31 are supported by the pillars 32 extending in the up-and-down direction, and the pipings 5 are arranged on each floor 31. Accordingly, even in the LNG plant, the pipe rack 3 is a structure suitable for forming performed by the 3D printer 1 by successively accumulating a constituent material from the lower layer side.

Further, the plant 1 may be a plant of a type among various types, such as a natural gas plant for liquefying natural gas and separating/recovering a natural gas liquid, a petroleum refining plant for distilling and desulfurizing crude oil or various intermediate products, and a chemical plant for producing a petrochemical product, an intermediate chemical product, and a polymer.

Further, with regard to installation of the devices 2, modules accommodating the devices 2 are built in, for example, some other place and conveyed to a location for installation, and the modules are connected to each other. In this manner, the plant may be constructed.

The invention claimed is:

1. A construction method for a plant configured to process a fluid, the construction method comprising the steps of:
    installing a group of devices for processing the fluid;
    disposing a 3D printer in a region different from an installation region where the group of devices is disposed; and
    forming, by the 3D printer, a framework structure configured to support a piping, which allows the fluid to be transferred among devices included in the group of devices, in the region different from the installation region for the group of devices,
    wherein the step of forming the framework structure is performed, after the step of installing the group of devices.

2. The construction method for a plant according to claim 1, further comprising:
    in addition to the step of forming the framework structure, a step of conveying a pipe material for forming the piping from an outside to the framework structure under formation, and forming the piping to be supported on the framework structure.

3. The construction method for a plant according to claim 2, wherein
    the framework structure is configured to support the piping by each floor of a multi-floor structure including a plurality of floors stacked in an up-and-down direction, and
    wherein forming of one floor included in the multi-floor structure in the step of forming the framework structure, and forming of the piping to be supported by the one floor in the step of forming the piping are performed repeatedly.

4. The construction method for a plant according to claim 1, wherein
    the 3D printer is configured to integrally form the piping and the framework structure.

5. The construction method for a plant according to claim 4, wherein
    the framework structure is configured to support the piping by each floor of a multi-floor structure including a plurality of floors stacked in an up-and-down direction, and
    wherein integral forming of one floor included in the multi-floor structure and the piping to be supported by the one floor in the step of forming the framework structure is performed repeatedly.

* * * * *